April 12, 1932.   R. R. BLOSS   1,853,401
FLUID COOLED BRAKE DRUM
Filed Oct. 24, 1930    2 Sheets-Sheet 1
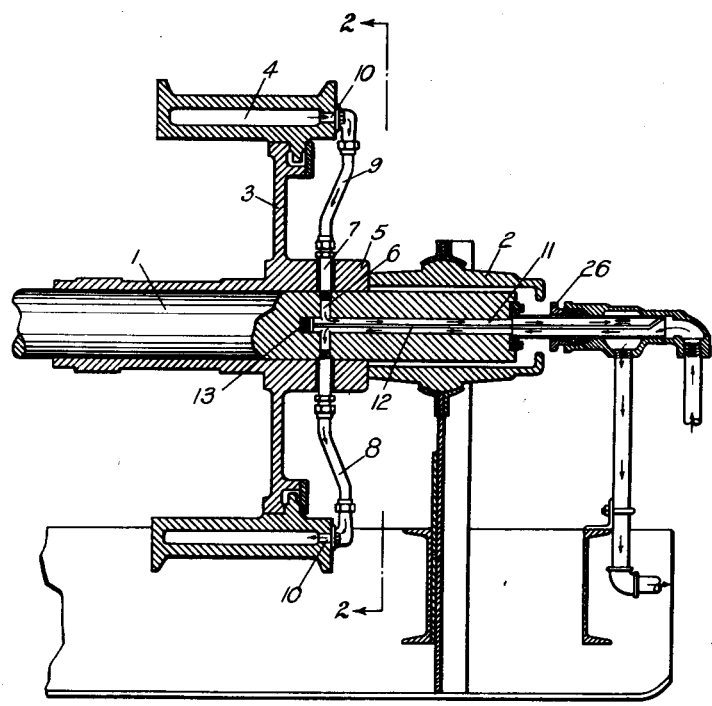
Fig 1
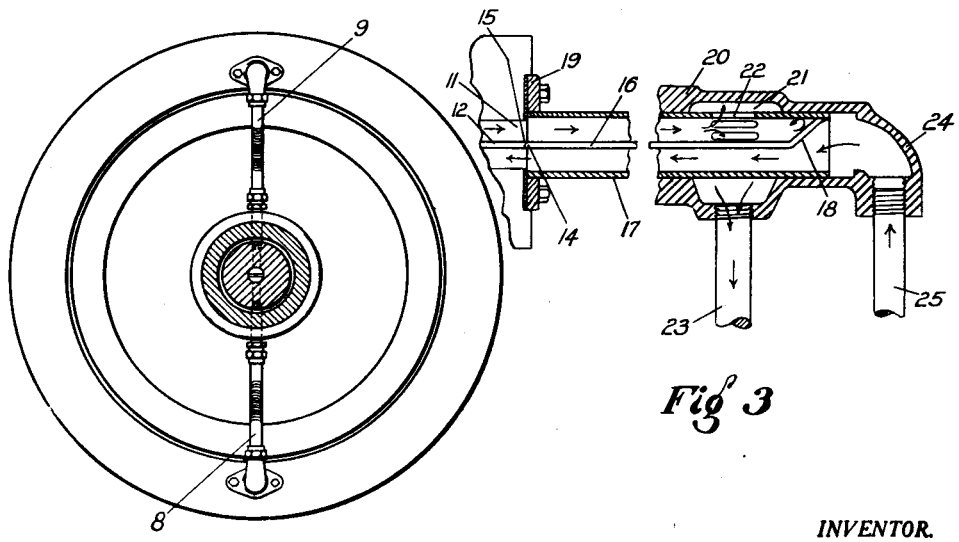
Fig 2
Fig 3
INVENTOR.
RICHARD R. BLOSS
BY *W. S. Babcock*
ATTORNEYS.

April 12, 1932.  R. R. BLOSS  1,853,401

FLUID COOLED BRAKE DRUM

Filed Oct. 24, 1930   2 Sheets-Sheet 2

INVENTOR.
RICHARD R. BLOSS
BY
*M. S. Babcock*
ATTORNEYS.

Patented Apr. 12, 1932

1,853,401

UNITED STATES PATENT OFFICE

RICHARD R. BLOSS, OF COLUMBUS, OHIO

FLUID COOLED BRAKE DRUM

Application filed October 24, 1930. Serial No. 490,945.

The invention to be hereinafter described relates to water cooled brake drums.

In the drawings illustrating the invention two related applications of the invention have been shown, one for a sand reel drum for oil well operations and the other for a draw works drum. It will at once be obvious that there are many other machines and apparatuses to which the invention is very readily applicable and with which any average skilled mechanic or engineer may easily and quickly combine it. Hoisting drums; cable way drums; drums of logging engines; elevator drums; are a very few of the many applications. On the other hand further illustration by drawings, with an invention as simple as the present, would serve only to defeat the purpose of specifications by beclouding rather than clarifying.

There are a considerable number of cooling systems at present actually in use to a greater or less degree and a much greater number of granted patents relating to or disclosing such systems. And, of course, there is considerable trade literature on the subject. In general they may all be classed in two large groups—internal and external application of cooling fluid. Those of the internal group are fairly represented by the jacketed construction in which the flange of the drum is hollow to provide a chamber through which a cooling fluid is passed to conduct away the heat of friction. Those of the external group are fairly represented by constructions in which the cooling fluid is applied from without as by one or more streams, jets or sprays directed against and over the outer face or wall of the inner flange, i. e., the surface with which the belt or the like does not contact.

In broad and general terms, the present invention would be classed in the first group. In this group applicant is familiar with disclosures in which there are several brake band rings with a pipe from one ring to the other; others in which a brake drum shaft is provided with a bore in each end, the cooling fluid conducted into and through the bore at one end, piped therefrom to the interior of the flange and piped from the flange to the bore in the opposite end of the shaft; others in which a single shaft carries a plurality of brake drums and is bored out its entire length with dams or plugs at each drum and radial passages or bores at each side of each dam to establish influx and efflux respectively to and from the particular drum; and a number of others including a wide variety of those just specifically mentioned.

Among the more serious objections to the constructions heretofore used are the complexities involved in the considerable number of parts in most of them; the difficult construction required in many; the cost in manufacture and maintenance; and the inefficiency in operation.

The main purposes of this invention are to overcome these and many other recognized objections and provide a simple, efficient, compact and economical construction which will have the least practicable number of working parts for production or maintenance cost, while at the same time adequately cooling the brake flange to avoid burning out or over-heating.

In order to more clearly disclose the construction, operations, and use of the invention reference should be had to the accompanying drawings forming part of the present application. Throughout the several figures of the drawings like reference characters designate the same parts in the various views.

In the drawings:—

Fig. 1 is a central vertical cross section;

Fig. 2 is a right-hand end view of Fig. 1, partly in section, on line 2—2;

Fig. 3 is an enlarged fragmentary cross section through the fluid feed and outlet connection;

Figure 4:
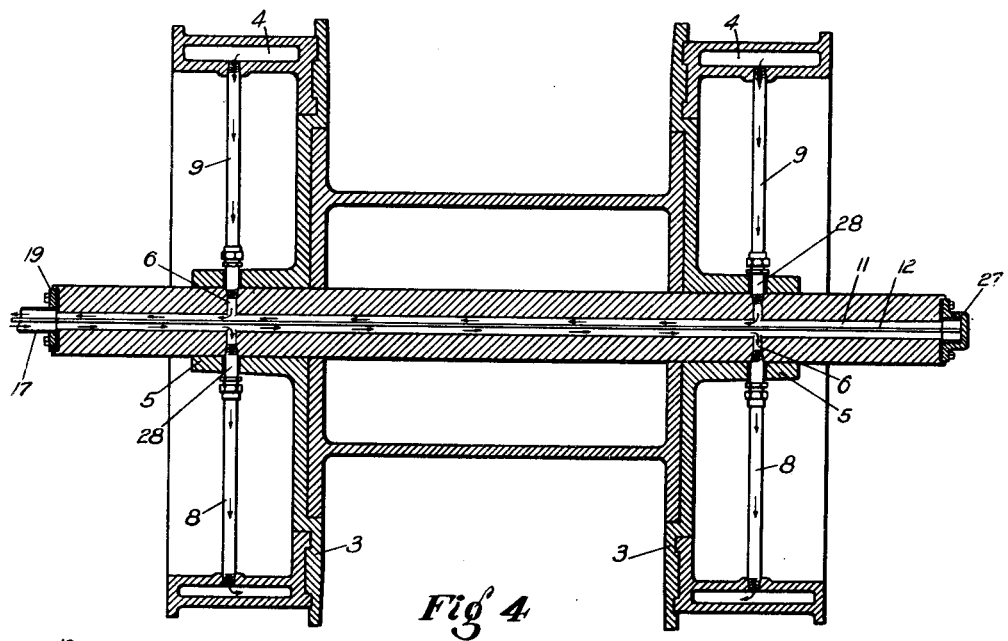
Fig. 4 is a view similar to Fig. 1 very slightly modified, but showing the invention as applied to a draw works, the shaft being shown as bored its entire length and connections run off to both brake flanges.

Referring to the drawings in detail, 1 indicates the shaft of a sand reel, draw works or other rotating member. It is suitably supported in adequate journals in well known manner. Preferably the supports include self-aligning bearings 2 of well known type. To the shaft is keyed or otherwise secured, to rotate therewith, in any well known manner the brake flange 3 having a jacket or chamber 4 for receipt and circulation of a cooling fluid. In the case of a sand reel, as in Fig. 1, the shaft 1 is bored centrally and longitudinally from the near end to a point beyond the near end of the hub 5 of the flange, relative to the seated or operative position of the brake flange on its shaft. From this longitudinal bore extend short radial or lateral bores or passages 6 which align with similar short bores 7 through the flange hub. Short pipes 8 and 9 lead from these aligned bores to bores 10 through one radial wall of the jacket or chamber 4. Any suitable connection may be used between the end of each pipe 8 and 9 and its respective bore 10. Preferably, the inner ends of these pipes are passed through small sleeves in the bores 7 and are then threaded into the correspondingly threaded ends of the bores 6. On reference to Figs. 1 and 3 it will be seen that the bore 11 receives a partition plate 12. The width of this plate equals the diameter of the bore and it extends from end to end of the bore. Consequently, it divides the cylindrical bore into two parallel semi-cylindrical passages. It is so placed within the bore as to establish communications between each of these two passages and one of the bores 6 and its respective pipe. To make an inexpensive and sufficiently fluid tight point between the inner end of bore 11 and corresponding end of plate 12, a rubber washer or plug 13 is seated in the inner end of the bore 11 and the end of plate 12 is forced snugly against it. The outer end of the plate is provided with a V-groove 14 extending across its entire width—as best seen in Fig. 3. It is adapted to receive and co-operate with a corresponding rib 15 in the end of a web 16 of the pipe section 17. Pipe section 17 is of the same inside diameter as bore 11 and web 16 extends diametrically of it and from end to end. Near the outer end web 16 is deflected toward the inner wall of the pipe as at 18 to completely close that end of one semi-cylindrical section of the pipe. The other section remains open at both ends. One end of pipe 17 is threaded to be screwed into a collar or washer 19 which surrounds the end of bore 11 and clamped tight against the end of shaft 1, by bolts or the like, a suitable gasket being interposed to make a tight joint. Thus, it will be seen that pipe 17 revolves with shaft 1 and about the same axis. About the pipe 17 is disposed a casting 20 having a substantially annular chamber 21 which is in communication with the semi-cylindrical passage of pipe 17 closed by the wall 18. A series of ports 22 through the wall of that passage provide outlet communication to chamber 21 from which leads a drain or out-flow pipe 23. Casting 20 is extended beyond the outer end of pipe 17 and provided with an elbow 24 to which is connected an inlet or supply pipe 25 by which the cooling fluid is supplied. The elbow, as will be seen, is in communication with the remaining passage of pipe 17. Pipe 20 and its connected parts may be supported by a suitable bracket or in any other manner desired. It is not thought that illustration of this detail will add to the clearness of the case and it is, therefore, omitted. It will be understood that casting 20 is stationary and that pipe 17 rotates therein. To make a fairly fluid tight joint between pipe and casting a packing gland 26 of any usual and well known construction is used. Water, of course, is the preferred cooling fluid. In operation it is fed in by pump or otherwise, through pipe 25, the lower semi-cylindrical passages of pipe 17 and bore 11 and down through pipe 8 from which it passes into chamber 4 of the brake drum. Here it contacts with the inner wall of the tread of the flange and absorbs its heat. As the flange rotates the water will be held out against that surface by centrifugal force, as will be readily understood. On the other hand accumulating fluid will fill the chamber and be forced, by the pressure in the system, to flow out through pipe 9 and reversely through the other cylindrical passages and, by way of ports 22 and chamber 21 into the outlet pipe 23. The entire circuit, above, is clearly indicated by arrows. While pipes 8 and 9 have been referred to as though one were directed upwardly and the other downwardly, it will be clearly understood that such is their relation only once in every revolution and that during each revolution they assume all relative positions between that and a position diametrically opposite thereto, as will be evident. It will also be evident that, regardless of such continually changing position the circulation remains unchanged, the fluid entering through one set of pipes and passages at all times and delivering through the other at all times.

It will be understood that four or other multiples of two may be resorted to instead of only two sets of pipes 8—9 and sectional passages leading to and from the supply and outlet or out flow. It would be necessary in such case to have a partition member with sections at 90° or other relative position according to the number of pipes leading to and from the chamber 4.

Figure 5:
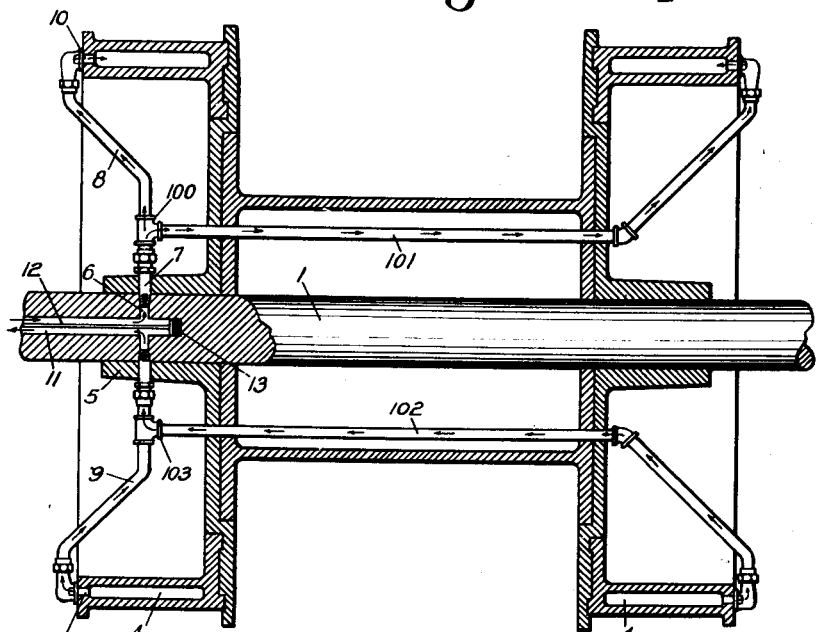
Fig. 5 is a view similar to Figs. 1 and 4, showing the preferred construction, as applied to a draw works.

When it is desired to apply the invention to a draw works having, as usual, two oppositely directed brake flanges, either of several arrangements may be used. A preferred construction is illustrated in Fig. 5 and will be described more fully hereinafter. Another construction as applied to a draw works is shown in Fig. 4 and will be later described in detail. A third arrangement is the application to each brake band of the same construction as that described for the sand reel (Figs. 1-3) except that the connections of pipes 8 and 9 would be in the opposite or outer radial walls, as would obviously be necessary.

In the form shown in Fig. 4 the shaft 1 is bored through from end to end and has one end closed by a cap 27 suitably secured thereto. Or, if preferred, the bore may stop a little short of the end. In this form the pipes 8 and 9 enter bores formed radially through the inner wall of the brake flange. Each pipe is a simple straight tube from the flange to a short distance from the hub. A nipple 28 seated in the radial bore through the brake flange hub and shaft 1 is coupled to the adjacent end of such pipe by a short straight threaded coupling, making a continuous pipe connection between the brake flange chamber and the shaft passage. In this arrangement, the two inlet or feed pipes lead from one shaft passage while the two outlet pipes lead to the other passage, as will be readily understood. For more than two brake flanges on the same shaft, it is only necessary to add the corresponding pipes 8 and 9 and their co-operating connections. The casting 20 and immediately co-operating parts, for simplicity and clearness, have been omitted from Fig. 4, as their application will be readily understood. On the same basis the barrel or other receiver has been omitted, as has also the pump. As will be readily understood, the same water usually is repeatedly circulated through the system, the pump drawing it from the barrel and the outlet 23 returning it thereto. Where there are two or more outlet pipes 23 they may be connected by a T or other suitable connection so that all drain out one pipe which delivers to the barrel.

The somewhat simpler, less expensive and equally efficient construction and arrangement shown in cross section in Fig. 5 comprises features of both Figs. 1 and 4. Instead of boring the shaft for the full length of the drum it is bored only to the depth necessary for a single drum, as in case of the sand reel. The inlet and outlet pipes lead to and from the respective sections of the bore, as in Fig. 1. On the other hand, the bore is of sufficient cross-sectional area to provide adequate inflow and outflow for two drums instead of one. And, in this construction, the pipes leading to and from the bore are each of sufficient diameter to conduct water for two drums instead of only one. In this construction, the inlet pipe 8 at a point between the shaft and brake flange is connected by a T or similar coupling 100 to the near end of a pipe 101 which passes through the body or spool of the draw works out through the radial wall of the opposite drum and then radially to a position to be connected to the cooling chamber of the second brake flange. In general the pipe 101 is L shaped and has the same kind of connection with the corresponding wall of the second brake drum flange as the pipe 8 has with its brake drum flange. A similar pipe 102 leads from the cooling chamber of the second drum through the spool or body and is connected to the outlet or outflow pipe 9 by a T or similar coupling 103 at a point between the shaft and the brake drum flange. Since the volume of flow through pipes 101 and 102 is only half of that through that portion of pipes 8 and 9 which is directly connected to the bore in shaft 1, the cross-sectional area of said pipes 101 and 102 need be only one half that of pipes 8 and 9 at such points. The construction thus provided is simple, efficient, compact, durable, and inexpensive, as will be readily understood. Likewise, it may be equally well applied to and used with any construction in which there is a similar arrangment of brake drums with intervening spool or hollow body. It is the preferred form of the invention as applied to a draw works.

On reference to Fig. 1 it will be noticed that the rim or flange in which is formed the chamber 4 is not integral with the part 3. It is free to move slightly radially, to accommodate expansion due to heat of friction. The construction, generally, corresponds to that disclosed in my Patent 1,696,664 Dec. 25, 1928, to which reference is hereby made for further details. It will be obvious that the pipes 8 and 9 which are of small diameter copper tubing, with several bends will accommodate themselves to the expansion of the rim. In the form shown in Fig. 4, if expansion flanges are used, a slight bend may be provided in each pipe, instead of being straight, to accommodate the expansion.

It is thought that the construction, assembly, operation and use of the invention will be clear from the preceding detailed description. Changes may be made in the construction, arrangement and disposition of the various parts of the invention, within the scope of the appended claims and it is meant to include all such within this application wherein only several preferred forms have been disclosed purely by way of illustrations and with no thought of limitation.

Having thus described my invention, what I claim and desire to protect by Letters Patent is:—

1. In combination in a fluid cooled brake drum, a shaft provided with a longitudinal passage, a partition plate mounted in said passage and dividing the same into parallel sections, a brake drum carried by said shaft and having a fluid receiving cooling chamber, means for delivering a cooling fluid from one of said sections to said chamber and means for delivering fluid from said chamber to another of said sections.

2. In combination in a fluid cooled brake drum, a shaft provided with a longitudinal passage, a partition plate mounted in said passage and dividing the same into parallel sections, a brake drum carried by said shaft and having a fluid receiving cooling chamber, means for delivering a cooling fluid from one of said sections to said chamber, means for delivering fluid from said chamber to another of said sections, a pipe divided into sections corresponding with the aforesaid sections and adapted to be aligned therewith, means closing one end of one of said sections in said pipe means for delivering cooling fluid to one section of said pipe, and means for delivering a cooling fluid from another section of said pipe.

3. A brake drum shaft provided with a longitudinal bore and lateral bores leading therefrom, and a partition plate dividing said bore into sections communicating with different ones of said lateral bores.

4. A brake drum shaft provided with a longitudinal bore and lateral bores leading therefrom, a partition plate dividing said bore into sections communicating with different ones of said lateral bores, means for delivering a fluid from a source of supply to one of said sections and means for delivering a fluid from another of said sections.

5. In combination, a shaft provided with a longitudinal passage, a partition plate dividing said passage into parallel sections, a plurality of brake flanges mounted on said shaft and each having a fluid receiving cooling chamber, means for delivering a cooling fluid from one section of said passage to each of said chambers, and means for delivering a fluid from each of said chambers to another section of said passage.

6. In combination, a revoluble shaft provided with a bore, a brake drum carried thereby and provided with a fluid receiving cooling chamber, a pipe leading from said bore to said chamber, a pipe leading from said chamber to said bore, a second drum carried by the aforesaid shaft and provided with a fluid receiving cooling chamber and pipes connecting with said chamber and with the aforesaid pipes.

7. A brake drum shaft provided with a longitudinal bore extending inwardly from one end to approximately the point of mounting of the brake drum and lateral bores leading therefrom, and a partition plate dividing said bore into sections communicating with different ones of said lateral bores.

In testimony whereof, I have affixed my signature.

RICHARD R. BLOSS.